US012587302B2

(12) United States Patent
Rekaya et al.

(10) Patent No.: US 12,587,302 B2
(45) Date of Patent: Mar. 24, 2026

(54) I/Q CODING METHOD FOR WDM COMMUNICATION SYSTEM OVER OPTICAL FIBRE

(71) Applicant: MIMOPT TECHNOLOGY, Paris (FR)

(72) Inventors: Ghaya Rekaya, Antony (FR); Akram Abouseif, Paris (FR)

(73) Assignee: MIMOPT TECHNOLOGY, Paris (FR)

( * ) Notice: Subject to any disclaimer, the term of this patent is extended or adjusted under 35 U.S.C. 154(b) by 276 days.

(21) Appl. No.: 18/685,145

(22) PCT Filed: Aug. 19, 2022

(86) PCT No.: PCT/FR2022/051589
§ 371 (c)(1),
(2) Date: Feb. 20, 2024

(87) PCT Pub. No.: WO2023/021260
PCT Pub. Date: Feb. 23, 2023

(65) Prior Publication Data
US 2025/0141589 A1 May 1, 2025

(30) Foreign Application Priority Data
Aug. 20, 2021 (FR) ..................................... 2108804

(51) Int. Cl.
*H04J 14/06* (2006.01)
*H04J 14/02* (2006.01)
(52) U.S. Cl.
CPC .......... *H04J 14/06* (2013.01); *H04J 14/0227* (2013.01)

(58) Field of Classification Search
None
See application file for complete search history.

(56) References Cited

U.S. PATENT DOCUMENTS

2014/0219653 A1 8/2014 Djordjevic et al.

FOREIGN PATENT DOCUMENTS

WO WO-2016145493 A1 * 9/2016 ......... H04B 10/5053

OTHER PUBLICATIONS

International Search Report dated Jan. 2, 2023 for International Application No. PCT/FR2022/051589.
(Continued)

*Primary Examiner* — David W Lambert

(57) ABSTRACT

The present invention relates to a method for dual-polarisation WDM transmission over optical fibre. The transmission method uses specific I/Q coding for combating the effects of PDL. The modulation symbols to be transmitted on the 2N polarisation states of the N wavelengths are broken down into real values and imaginary values (220). A first orthogonal linear transformation (230-1) is applied to the vector of the real values thus obtained and a second orthogonal linear transformation (230-2), separate from the first, is applied to the vector of the imaginary values thus obtained. A complex scalar solving an irreducible polynome of $\mathbb{R}[X]$ in $\mathbb{R}$ is multiplied with the first or second transformed vector before the two transformed vectors are summed (240) in order to provide a vector of transmission symbols for modulating the different states of polarisation of the WDM channels.

10 Claims, 8 Drawing Sheets

(56) References Cited

OTHER PUBLICATIONS

Chen Zhu et al "Improved polarization dependent loss tolerance for polarization multiplexed coherent optical systems by polarization pairwise coding", Optics Express, vol. 23, No. 21, Oct. 9, 2015, pp. 27434-27447.

Elie Awwad "Emerging space-time coding techniques for optical fiber transmission systems", Networking and Internet Architecture, Télécom ParisTech, 2015, NNT : 2015ENST0004.tel-01230644.

* cited by examiner

I/Q CODING METHOD FOR WDM COMMUNICATION SYSTEM OVER OPTICAL FIBRE

CROSS-REFERENCE TO RELATED APPLICATION

This application is a national stage application, filed under 35 U.S.C. § 371, of International Patent Application No. PCT/FR2022/051589, filed on Aug. 19, 2022, which claims the priority to French application No. FR2108804 filed Aug. 20, 2021, which is incorporated by reference herein in its entirety.

TECHNICAL FIELD

The present invention relates to the field of optical fiber communications and more particularly wavelength division multiplexing or WDM (Wavelength Division Multiplexing) communications.

PRIOR ART

WDM communication systems over optical fibers commonly used achieve transmission rates of the order of several Tb/s. Different types of WDM systems are known in the state of the art, some being defined in wavelengths (CWDM for Coarse Wavelength Division Multiplexing) and others, more recent, being defined in frequencies (DWDM for Dense WDM). The difference between CWDM and DWDM systems is essentially the spacing between transmission channels. When the transmission channels are contiguous or even overlapping, we respectively speak of a WDM superchannel and of a Nyquist superchannel. The term WDM will be used in the following in its general sense and will cover the different types of systems mentioned above.

The use of high modulation orders as well as multiplexing on orthogonal polarizations have made it possible to further increase the capacity of these communication systems, but this progress now comes up against various limitations.

First of all, the increase in the density of WDM transmission channels and correlatively the bringing together of the subcarriers, leads to an increase in the inter-channel interference level or ICI (Inter Channel Interference). This interference can be fought by adopting an ideally rectangular shaping of the channels in the frequency domain, in other words by a waveform according to a sync function in the time domain (so-called Nyquist shaping). Of course, in practice the shaping is imperfect and residual inter-channel interference remains.

Then, different dispersion phenomena such as chromatic dispersion or CD (Chromatic Dispersion), polarization dispersion or PMD (Polarization Mode Dispersion) and polarization-dependent attenuation or PDL (Polarization Dependent Loss) increase the error rate (BER) in the different channels. However, if the first two can be compensated digitally at reception, the last cannot be due to its non-unitary nature, which degrades the performance of WDM transmission systems in terms of BER depending on the bit rate, and therefore on transmission capacity.

It was proposed in Elie Awad's thesis entitled "Emerging space-time coding techniques for optical fiber transmission systems", published in 2015, to use spatio-temporal coding techniques to fight the degradation of capacity of transmission due to the PDL. However, these coding techniques complicate the transmitter and the receiver since the block of information symbols to be transmitted is coded over several successive transmission intervals or TTIs (Time Transmission Intervals) and, more generally, over several channel uses or CUs (Channel Uses).

A precoding method on orthogonal polarizations to fight the reduction in capacity due to PDL was described in the article by C. Zhu et al. entitled «Improved polarization dependent loss tolerance for polarization multiplexed coherent optical systems by polarization pairwise coding» published in J. Lightwave Technology, vol. 34 no. 8, pages 1746-1753, 2016.

This method of precoding on orthogonal polarizations was illustrated schematically in FIG. 1.

The information symbols (binary words) to be transmitted are converted into symbols of a modulation constellation in the q-ary symbol modulators 110-1 and 110-2. The obtained modulation symbols, $x_1$, $x_2$ are then submitted to a rotation of angle $\theta$ in the complex plane using respective rotation modules 120-1 et 120-2 to obtain rotated symbols, $x_1^\theta$, $x_2^\theta$. The real part of the first rotated symbol and the real part of the second rotated symbol are combined in 130-1 to provide a first emission symbol, $\tilde{x}_1 = \Re(x_1^\theta) + j \Re(x_2^\theta)$, carried by a first polarization component (for example a first horizontal polarization state). Similarly, the imaginary part of the first rotated symbol and the imaginary part of the second rotated symbol are combined in 130-2 to provide a second emission symbol $\tilde{x}_2 = \Im(x_1^\theta) + j \Im(x_2^\theta)$, carried by a second polarization component, of polarization orthogonal to the first one (for example a vertical polarization state).

The light signal whose orthogonal polarization components have been respectively modulated by the emission symbols $X_1$, $X_2$ is then transmitted over the optical fiber.

The precoding method described in this article, however, only applies to a single-carrier transmission system and not to a WDM transmission system.

An object of the present invention is therefore to propose a WDM transmission method over optical fiber which makes it possible to achieve high transmission capacities despite the PDL and the interference between adjacent channels while requiring only one use of transmission channel to transmit a block of information symbols.

SUMMARY OF THE INVENTION

The present invention is defined by a WDM transmission method over optical fiber with polarization duality, intended to transmit, during one channel use, 2N symbols belonging to a modulation constellation in the complex plane, N being the number of WDM channels used for transmission, said method being original in that:

said symbols undergo a separation into real part and imaginary part to provide a first vector consisting of the real parts of these symbols and a second vector consisting of the imaginary parts of these same symbols;

a first orthogonal linear transformation is applied to the first vector to provide a first transformed vector;

a second orthogonal linear transformation, distinct from the first, is applied to the second vector to provide a second transformed vector;

a complex scalar, solution of an irreducible polynome from $\mathbb{R}[X]$ to $\mathbb{R}$ is multiplied to the first or to the second transformed vector, before the two transformed vectors are summed to provide a vector consisting of 2N complex emission symbols, each complex transmission symbol modulating a first and a second polarization states of a WDM channel. According to a preferred embodiment, the first linear transformation is the composition of a first rotation with a first non-trivial permutation and/or a first non-trivial reflection in $\mathbb{R}^{2N}$ and that the second linear transformation is the composition of a second rotation with a second non-trivial permutation and/or a second non-trivial reflection in $\mathbb{R}^{2N}$. According to a first example, the first permutation can be composed of an even plurality of transpositions and that the second permutation is composed of an odd plurality of transpositions, or vice versa.

The first rotation and the second rotation can be chosen identical.

Alternatively, the first orthogonal linear transformation can be chosen equal to the identity.

Whatever the embodiment, the complex scalar, $\alpha$, can advantageously be chosen such that $\alpha^{2N}$ is not a positive real.

The complex scalar can for example be equal to j with $j^2=-1$. In this case, the number N can be chosen odd with $N \geq 3$.

BRIEF DESCRIPTION OF THE DRAWINGS

Other characteristics and advantages of the invention will appear on reading a preferred embodiment of the invention, described with reference to the attached figures including.

DETAILED DESCRIPTION OF SPECIFIC EMBODIMENTS

We will consider in the following a WDM transmission system over optical fiber and assume that this fiber is classically affected by PDL attenuation, in other words that the different states of polarization in the fiber do not undergo the same attenuation. It is recalled that PDL attenuation is generally introduced by optical elements between fiber sections, in particular doped fiber optical amplifiers (EDFA) which create energy losses and fluctuations in optical signal to noise ratio or OSNR (Optical Signal to Noise Ratio). Abstraction will be made however of the dispersive effects in the fiber such as chromatic dispersion (CD) and polarization dispersion (PMD) as these effects can be effectively corrected by channel equalization in the DSP of the receiver.

The effect of PDL attenuation for a WDM channel (and a single spatial mode) can be expressed by the $H_{PDL}$ matrix applied to the two polarization states:

$$H_{PDL}=D_\gamma R_\varphi B_\beta$$

where $$D_\gamma = \begin{pmatrix} \sqrt{1+\gamma} & 0 \\ 0 & \sqrt{1-\gamma} \end{pmatrix}$$

is the gain matrix, $$R_\varphi = \begin{pmatrix} \cos\varphi & -\sin\varphi \\ \sin\varphi & \cos\varphi \end{pmatrix}$$

is the polarisation rotation matrix and $$B_\beta = \begin{pmatrix} \exp(i\beta) & 0 \\ 0 & \exp(i\beta) \end{pmatrix}$$

is the birefringence matrix with $\gamma \in [0, 1]$ defining the value of PDL PDL, $\Gamma_{dB}=\log_{10}(\Gamma)$, with $$\Gamma = \frac{1+\gamma}{1-\gamma}$$

and $\varphi$, $\beta \in [-\pi, \pi]$.

The WDM transmission system uses a plurality N of WDM channels (wavelengths or subcarriers), each WDM channel being associated with two polarization states. Thus, at each transmission instant, in other words at each use of the channel, the transmission system can transmit 2N modulation symbols, one symbol being transmitted per polarization state and per WDM channel. The number N is generally chosen high, of the order of several tens or even several hundred. In any case $N>1$ and, preferably, $N>2$.

The idea underlying the present invention is to separate the real parts and the imaginary parts of the different modulation symbols and to subject them to distinct orthogonal linear transformations before recombining them in the complex plane to then modulate with the obtained symbols the different wavelengths/the different subcarriers of the WDM multiplex. We thus carry out an averaging of the PDL attenuation over the different polarization states and the different WDM channels.

Figure 1:
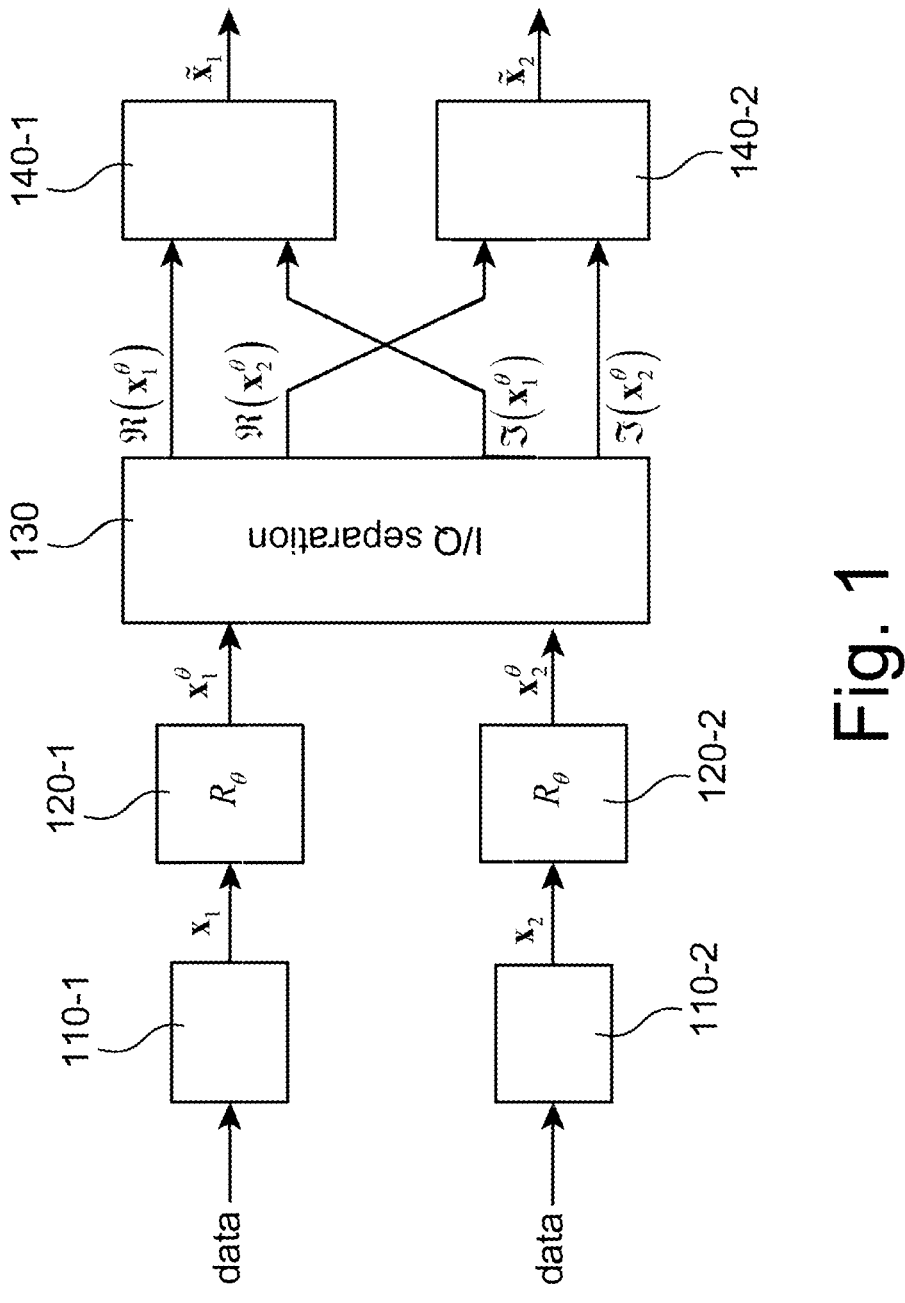
FIG. 1, already described, schematically represents an optical fiber transmission device using pre-coding on two orthogonal polarizations.
Figure 2:
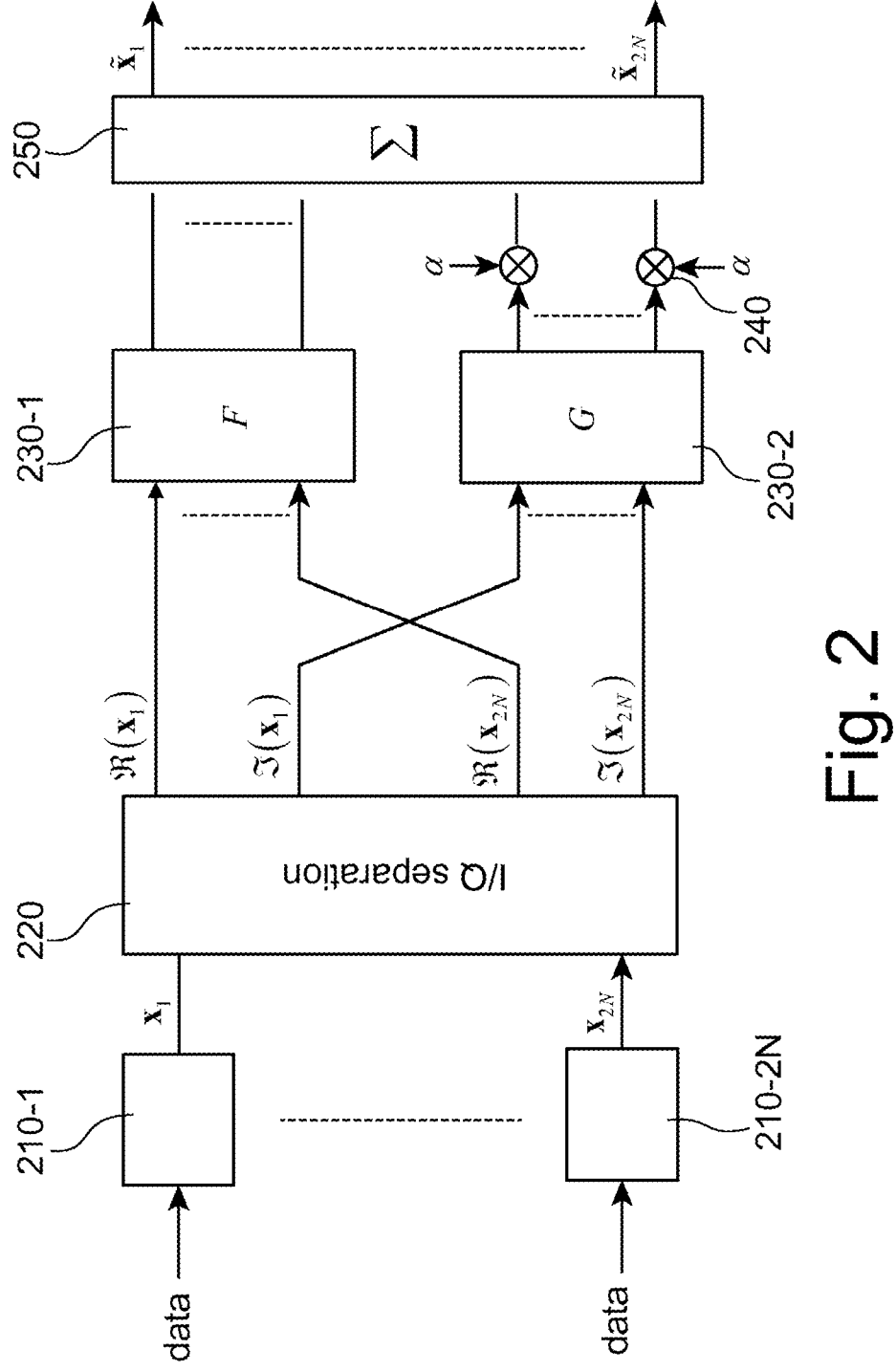
FIG. 2 schematically represents a WDM transmission device over optical fiber with IQ coding according to a general embodiment of the invention.

FIG. 2 schematically represents a WDM transmission device over optical fiber according to a general embodiment of the invention.

The data to be transmitted at each transmission interval is in the form of 2N information symbols, for example 2N q-ary words with $q \leq \log_2 Q$ where Q is the cardinal of the modulation alphabet. The modulation alphabet may in particular be a Q-QAM alphabet.

The information symbols may themselves result from source coding and/or channel coding, in a manner known per se.

In all cases, the 2N information symbols are respectively converted into 2N modulation symbols in the q-ary symbol modulators 210-1, . . . , 210-2N. The odd indices of these symbols correspond to a first polarization state and the even indices to a second polarization state, orthogonal to the first. Each of these modulation symbols, denoted in the following $x_1, \ldots, x_{2N}$, is then subjected to a decomposition into a real part and an imaginary part in the separation module I/Q, 220.

The respective real parts of these modulation symbols $\Re(x_1), \ldots, \Re(x_{2N})$ form a vector $X_R$ in $\mathbb{R}^{2N}$ which is supplied to a first linear combination module 230-1. This first module combines these real parts by means of a first orthogonal linear transformation, F, represented by a matrix $F \in O(2N, \mathbb{R})$, to provide a first transformed vector $\tilde{X}_R$, in $\mathbb{R}^{2N}$.

Similarly, the imaginary parts of the modulation symbols form a vector $X_I$ in $\mathbb{R}^{2N}$ which is supplied to a second linear combination module, 230-2. This second module combines these imaginary parts by means of a second orthogonal linear transformation, G, represented by a matrix $G \in O(2N, \mathbb{R})$, to provide a second transformed vector, $\tilde{X}_I$, in $\mathbb{R}^{2N}$.

The orthogonal linear transformations F and G are advantageously chosen distinct. For example, one of them could be a direct orthogonal linear transformation, in other words the corresponding matrix will be an element of the special orthogonal group $SO(2N, \mathbb{R})$, and the other will be an indirect orthogonal linear transformation.

The second transformed vector is then multiplied in 240 by a complex scalar value $\alpha$, solution of a polynome of $\mathbb{R}[X]$, irreducible in $\mathbb{R}$. Preferably, $\alpha$ will be chosen not to be a norm of an element in the complex plane, in other words $\alpha^{2N}$ should not be a positive real.

The first transformed vector and the second transformed vector thus multiplied are finally summed in the adder 250 to provide a vector in $\mathbb{C}^{2N}$, $\tilde{X}$ whose complex elements $\tilde{x}_1, \ldots, \tilde{x}_{2N}$ are transmission symbols respectively used to modulate the 2N polarization states of the N WDM channels. More precisely the component of a first polarization state (for example a horizontal polarization component) of a WDM channel of index n will be given by $\Re(\tilde{x}_n)$ and that of a second polarization state (for example a vertical polarization component) of this channel will be given by $\Im(\tilde{x}_n)$, or vice versa.

Thus, the vector $\tilde{X}$ can be expressed, up to a multiplicative coefficient, in the form:

$$\tilde{X} = FX_R + \alpha GX_I \tag{1}$$

According to a variant not shown, the first transformed vector is multiplied by the complex scalar value $\alpha$ in place of the second transformed vector, the first transformed vector thus multiplied being then summed with the second transformed vector to provide the vector $\tilde{X}$.

Figure 3:
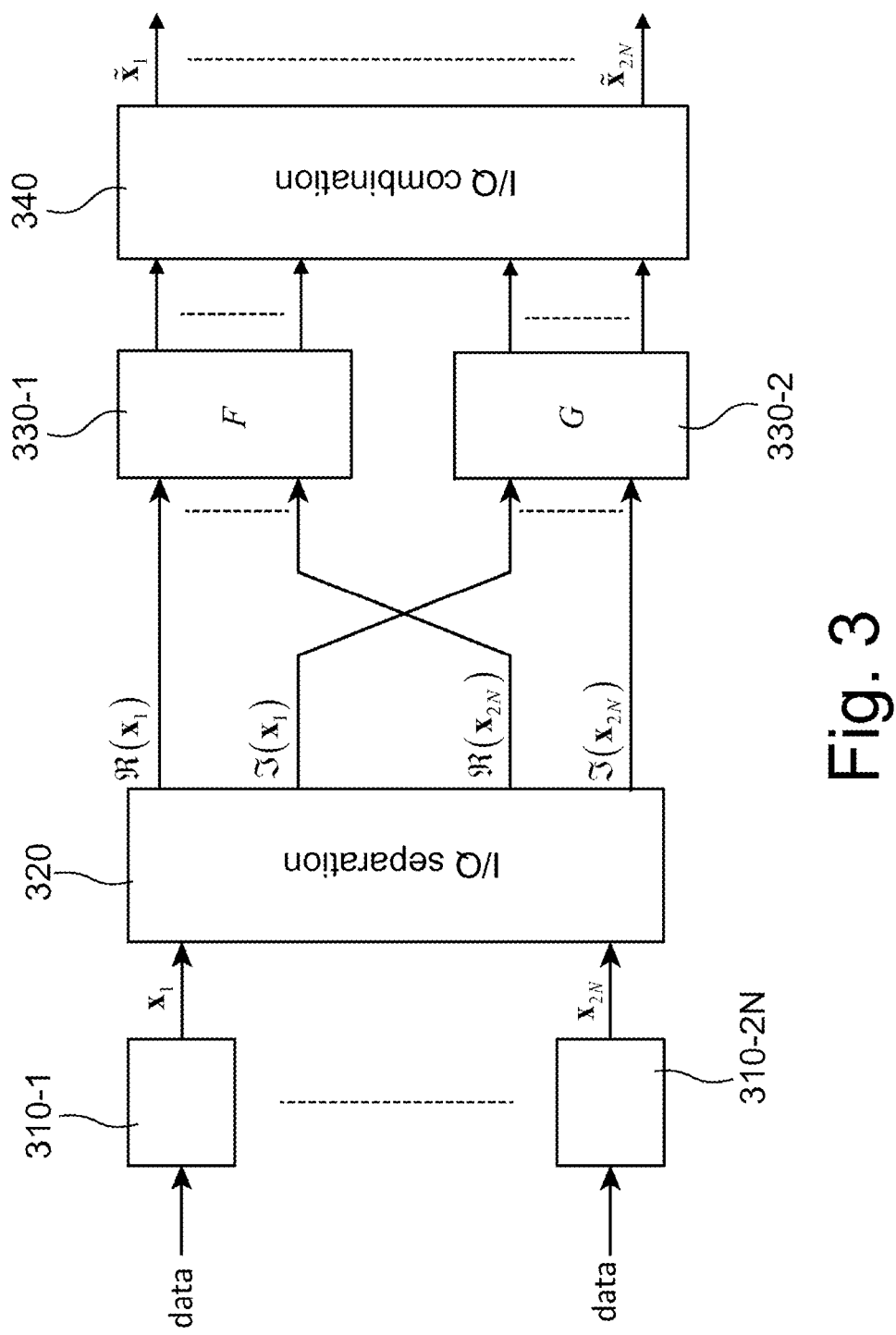
FIG. 3 schematically represents a WDM transmission device over optical fiber with IQ coding according to a preferred embodiment of the invention.

FIG. 3 schematically represents a WDM transmission device on optical fiber according to a preferred embodiment of the invention.

Modules 310-1, . . . , 310-2N, 320, 330-1 and 330-2 respectively fulfill the same functions here as modules 210-1, . . . , 210-2N, 220, 230-1 and 230-2 in FIG. 2.

Unlike the embodiment illustrated in FIG. 2, the first transformed vector and the second transformed vector are combined by the I/Q combination module, 340, to form the complex vector $\tilde{X} = \tilde{X}_R + j\tilde{X}_I$ of $\mathbb{C}^{2N}$. In other words, this embodiment is deduced as a special case from the general embodiment with $\alpha = j$, the I/Q combination module here replacing the multiplier 240 and the adder 250.

Advantageously, the complex scalar $\alpha$ is not a norm, in other words N is chosen odd with $N \geq 3$.

The complex elements $\tilde{x}_1, \ldots, \tilde{x}_{2N}$ of the vector $\tilde{X}$ are respectively used to modulate the 2N polarization states of the N WDM subcarriers/wavelengths.

Figure 4:
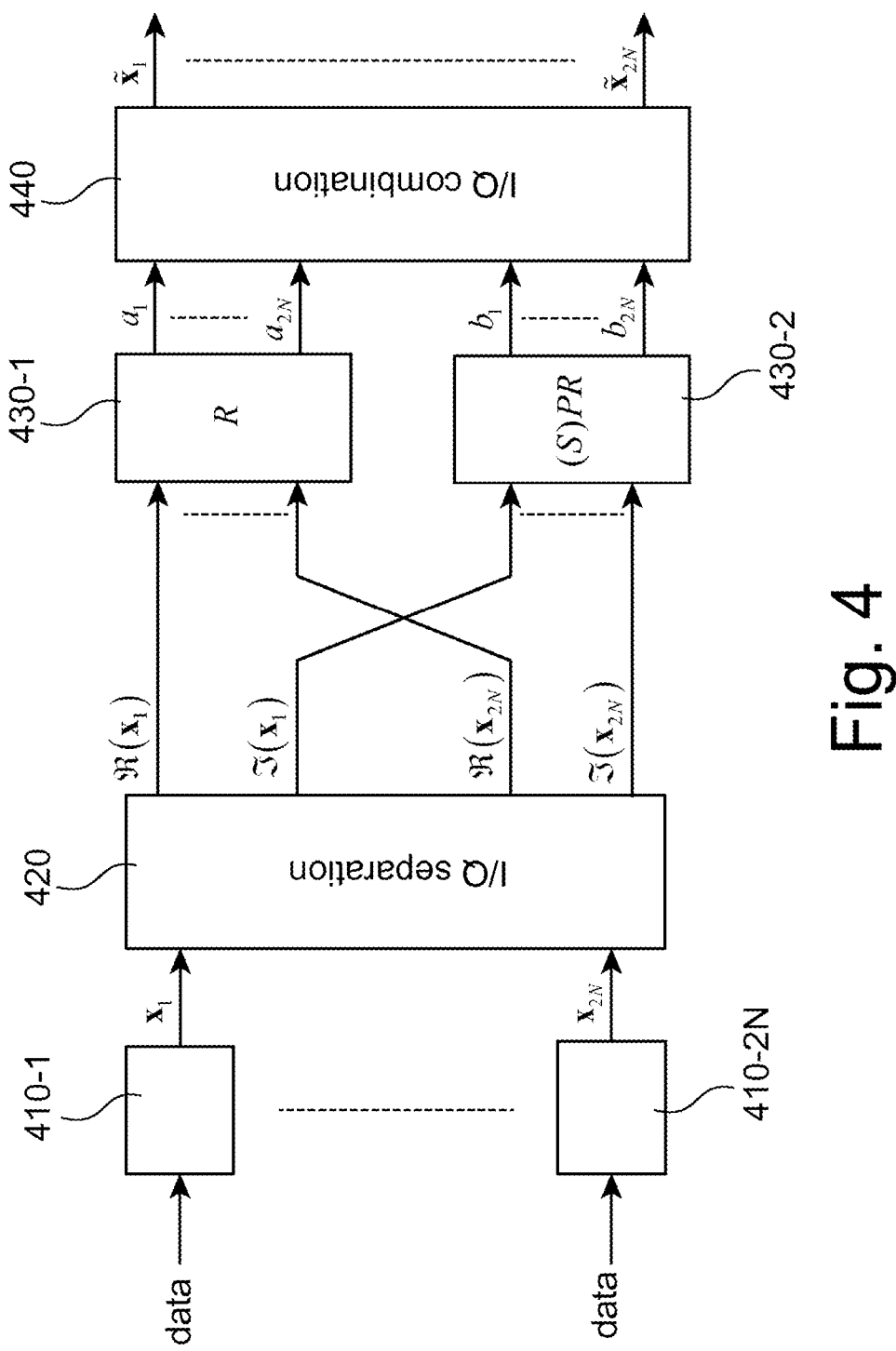
FIG. 4 schematically represents a WDM transmission device over optical fiber with IQ coding according to a first embodiment of the invention.

FIG. 4 schematically represents a WDM transmission device over optical fiber with IQ coding according to a first embodiment of the invention.

Modules 410-1, . . . , 410-2N, 420, 430-1, 430-2, 440 respectively perform the same functions as modules 310-1, . . . , 310-2N, 320, 330-1, 330-2 and 340 of FIG. 3.

This embodiment is a particular case of the preferred embodiment of FIG. 3 in that the first linear transformation is direct, that is to say a rotation R in space in $\mathbb{R}^{2N}$.

The second linear transformation results from the composition of this rotation R with a non-trivial permutation P in $\mathbb{R}^{2N}$ and/or a non-trivial reflection S in $\mathbb{R}^{2N}$. By non-trivial permutation, we mean a permutation distinct of identity $Id_{\mathbb{R}^{2N}}$. By non-trivial reflection, we mean a reflection distinct from $-Id_{\mathbb{R}^{2N}}$.

The permutation can be composed of an even number of transpositions in which case the second linear transformation is still a rotation, or it can be composed of an odd number of such transpositions.

The permutation can be cyclic, the second linear transformation then being represented by the matrix PR where $P \in \{\Phi, \Phi^2, \ldots, \Phi^{2N-1}\}$ set of possible permutations (except the trivial permutation) and where $\Phi$ is the cyclic permutation matrix defined by:

$$\Phi = \begin{pmatrix} 0 & 1 & 0 & \ldots & 0 \\ 0 & 0 & 1 & \ldots & 0 \\ \vdots & & \ddots & \ddots & \vdots \\ 0 & 0 & \ldots & 0 & 1 \\ 1 & 0 & \ldots & 0 & 0 \end{pmatrix}$$

As in the general case, the roles first and second linear transformations can be interchanged. In other words, the rotation R can be applied to the vector of imaginary parts $X_I$ and the compound of rotation and permutation and/or reflection (S)PR/S(P)R can be applied to the vector of real parts $X_R$.

Figure 5:
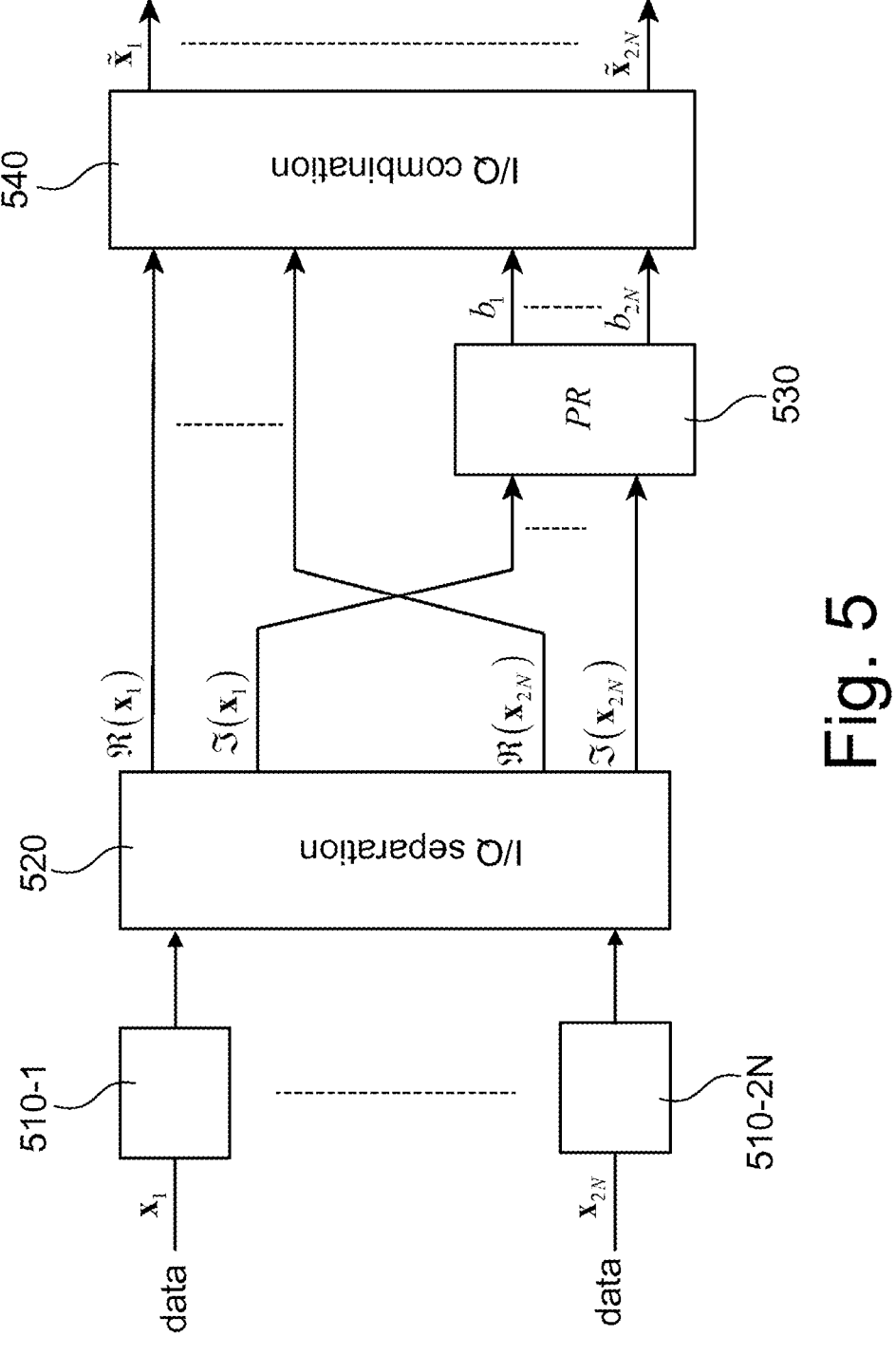
FIG. 5 schematically represents a WDM transmission device over optical fiber with IQ coding according to a second embodiment of the invention.

FIG. 5 schematically represents a WDM transmission device over optical fiber with IQ coding according to a second embodiment of the invention.

Modules 510-1, . . . , 510-2N, 520, 530, 540 respectively perform the same functions as modules 310-1, . . . , 310-2N, 320, 530-2 and 540 in FIG. 3.

This exemplary embodiment is a particular case of the preferred embodiment of FIG. 3 in that the first linear transformation is trivial and equal to identity $Id_{\mathbb{R}^{2N}}$, and that the second linear transformation results from the composition of this rotation R with a trivial or non-trivial permutation P in $\mathbb{R}^{2N}$.

The first vector and the second transformed vector are here combined to form the complex vector $\tilde{X}$ of symbols intended to modulate the 2N polarization states as above.

In all cases, the received optical signal is demultiplexed per WDM channel (wavelength or subcarrier) and per polarization state then equalized to compensate for chromatic dispersion (CD). The 2N×2N MIMO channel is then estimated, for example using an LS (Least Squares) algorithm from pilot symbols. The symbols transmitted by the transmission device can then be estimated using a MIMO decoder using an ML (Maximum Likelihood) estimate or more simply a ZF (Zero Forcing) estimate aimed at multiplying the signal received by the pseudo-inverse of the channel matrix, namely $\hat{\tilde{X}} = (H^H H)^{-1} H^H Y$ where $\hat{H}$ of size 2N×2N is the estimated matrix of the MIMO channel.

After separation of the real and imaginary parts of each of the components of $\hat{\tilde{X}}$ and formation of a first vector $\overline{X}_R$ consisting of the 2N real parts and of a second vector $\overline{X}_I$ consisting of the 2N imaginary parts, a first inverse orthogonal transformation $F^{-1}$ is applied to the first vector $\overline{X}_R$ and a second inverse orthogonal transformation $G^{-1}$ is applied to the second vector, multiplied by $\alpha^{-1}$, $\alpha^{-1}\overline{X}_I$. We can then estimate the real and imaginary parts of the modulation symbols from the components of the same rank of the vectors thus obtained.

Figure 6A:
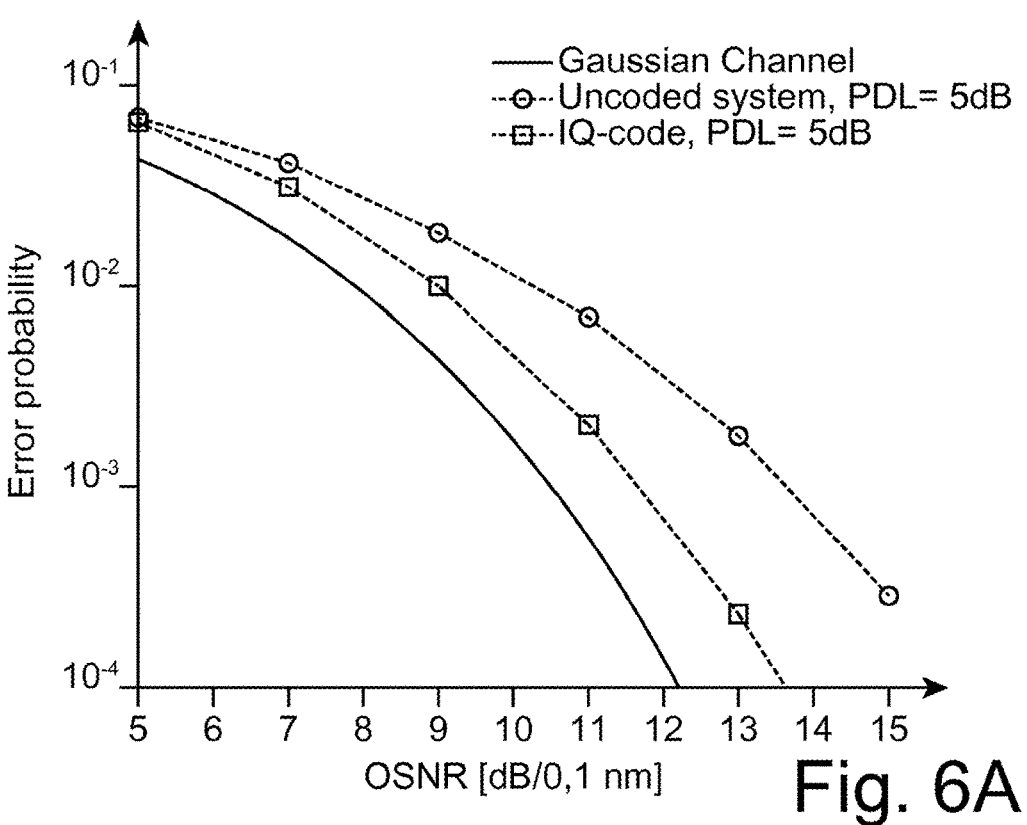
FIGS. 6A-6C show the gain provided by a WDM transmission device according to the invention for different hypotheses of numbers of channels.
Figure 6B:
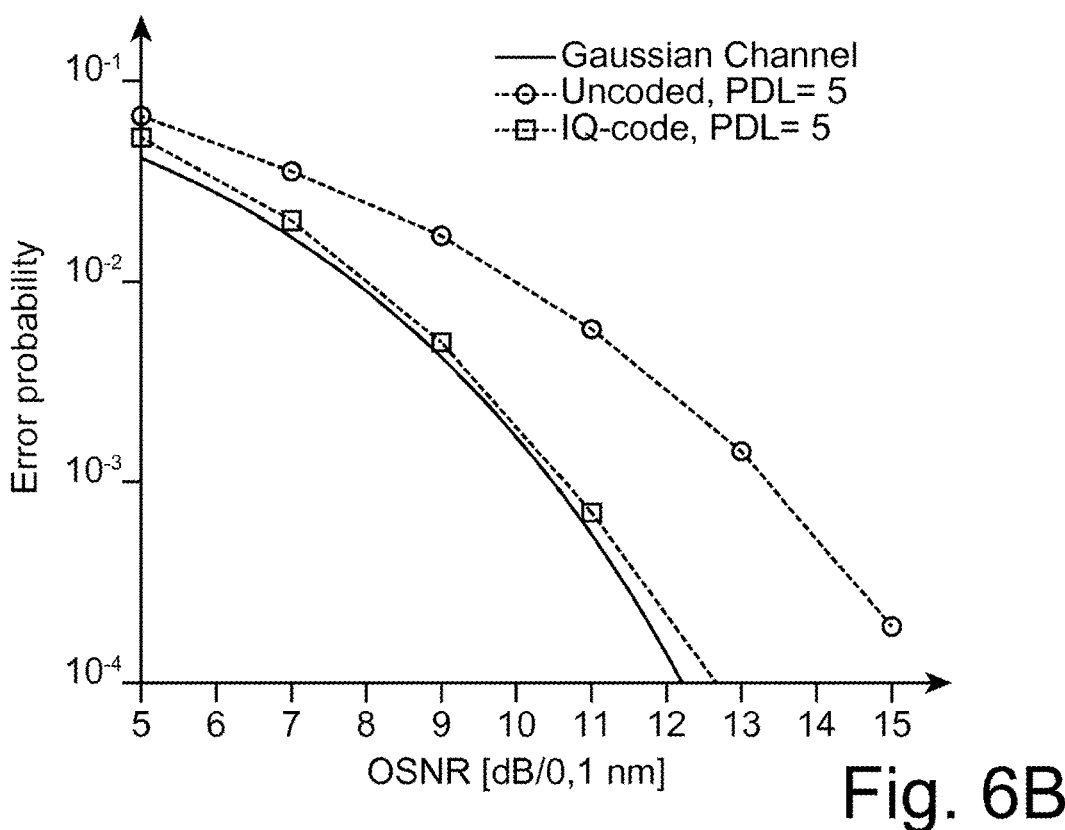
Figure 6C:
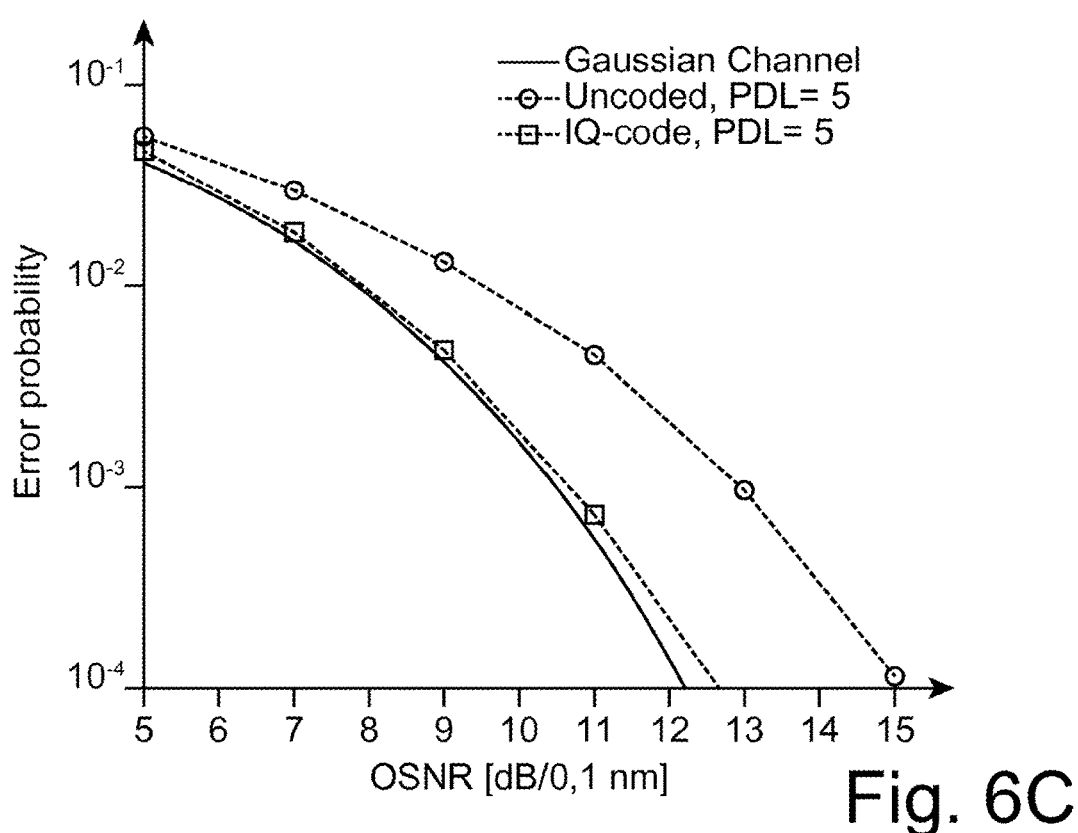

FIGS. 6A-6C show the gain provided by a WDM transmission device according to the invention for different hypotheses of numbers of WDM channels.

The value of PDL, $\Gamma_{dB}$ was assumed to be the same for all WDM channels and equal to 5 dB, the polarization rotation, $\phi$ was equal to $\pi/2$.

The optical fiber was made up of 10 sections of 100 km each, an optical amplifier with constant gain in wavelength being provided between consecutive sections. The symbol rate was 12 Gbauds and the modulation constellation was 16-QAM. The sub-bands corresponding to the different WDM channels were non-overlapping and the signals transmitted in each sub-band were shaped by a cosine root raised with a roll-off factor of 0.1 filter.

The chosen embodiment was that of FIG. 5 with $P=Id_{2N}$.

The estimate upon receipt was carried out using an ML estimator.

FIG. 6A gives the bit error rate (BER) as a function of the optical signal-to-noise ratio (OSNR) in the fiber for N=2 wavelengths. In this case, we have $\alpha^{2N}=1$ but we nevertheless observe a gain (of OSNR) of 2 dB compared to a non-IQ coded WDM system, the difference with the ideal channel (Gaussian channel) being only 0.6 dB.

FIG. 6B gives the BER as a function of the OSNR for N=3 wavelengths. In this case, we have $\alpha^{2N}=-1$. We observe a gain of 2.6 dB greater than in the previous case and the deviation from the ideal channel is negligible, in other words the effect of the PDL is almost entirely corrected by the averaging.

FIG. 6C gives the BER as a function of the OSNR for N=5 wavelengths. The property $\alpha^{2N}=-1$ is again verified and the performances obtained are approximately the same as for N=3.

Figure 7A:
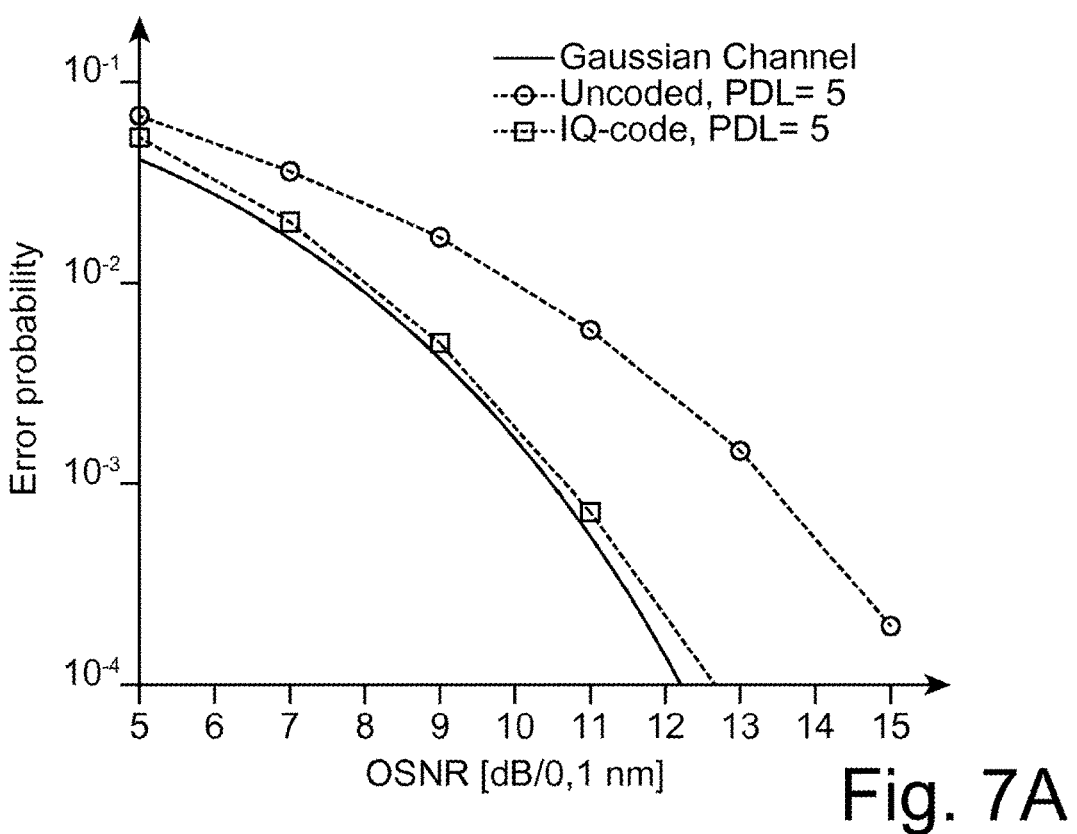
FIGS. 7A-7C show the gain provided by a WDM transmission device according to the invention for different PDL hypotheses in the optical fiber.
Figure 7B:
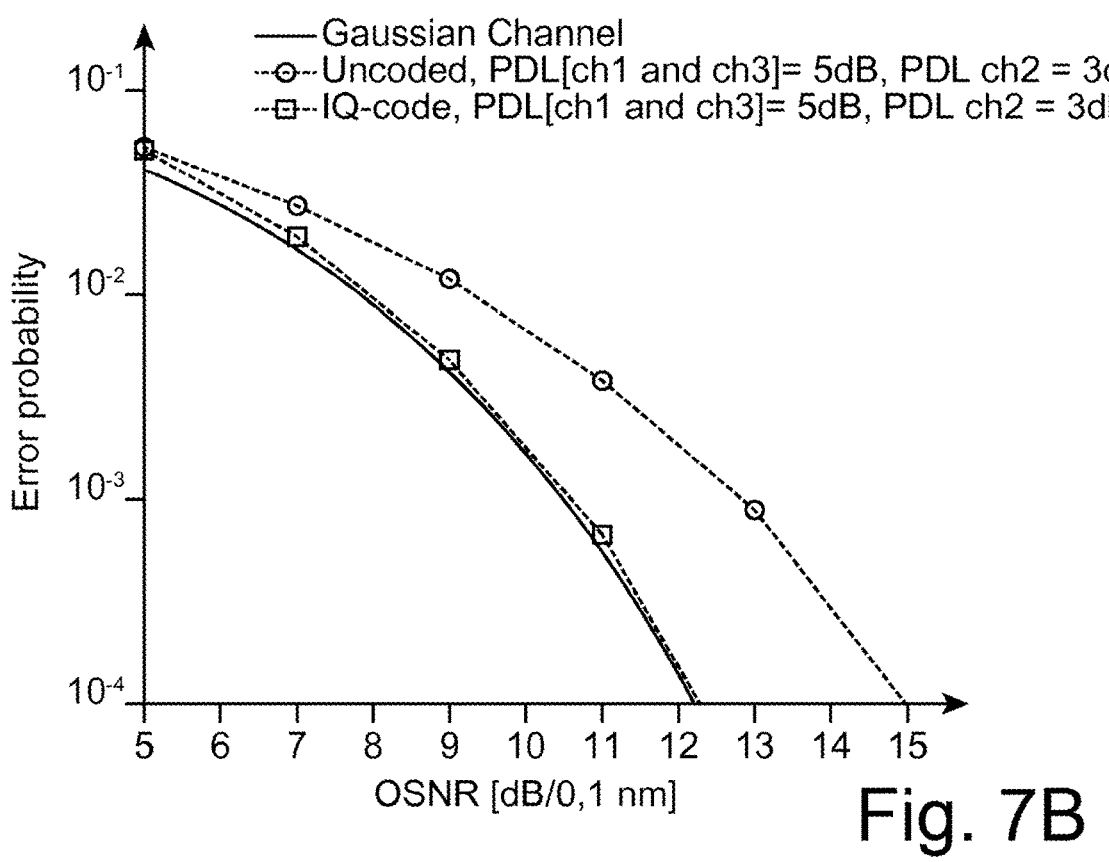
Figure 7C:
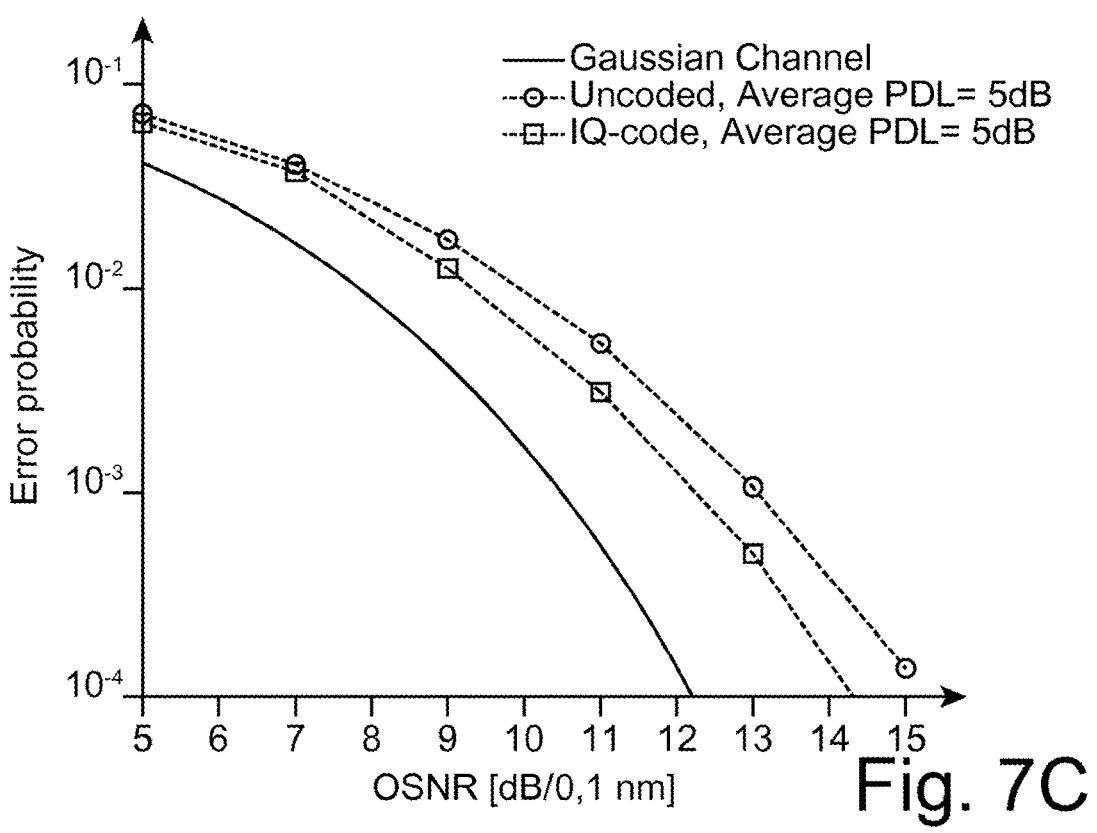

FIGS. 7A-7C show the gain provided by a WDM transmission device according to the invention for different PDL hypotheses in the optical fiber.

We place ourselves in the previous case where N=3 wavelengths but we consider different PDL configurations.

In FIG. 7A, it was assumed that the PDL, $\Gamma_{dB}$, was identical on the three channels and equal to 5 dB. IQ coding according to the present invention makes it possible to achieve a gain of 1.8 dB compared to the uncoded case and only presents a deviation of 1 dB compared to the Gaussian channel.

In FIG. 7B it was assumed that the PDL, $\Gamma_{dB}$, was of 3 dB on channels 1 and 3 and of 5 dB on channel 2. The rotation angles $\varphi_1$, $\varphi_2$, $\varphi_3$ are drawn randomly from a uniform probability distribution on $[-\pi, \pi]$. IQ coding according to the present invention makes it possible to achieve a gain of 2 dB compared to the uncoded case and only presents a deviation of 0.6 dB compared to the Gaussian channel.

Finally, in FIG. 7C it was assumed that the PDL at the output of each optical amplifier followed a Gaussian law and that, consequently, the probability distribution of the PDL at the fiber output followed a Maxwell distribution. The average of the PDL was chosen equal to 5 dB. Here again, the transmission method according to the present invention makes it possible to achieve, in the most unfavorable case, a gain of 1 dB compared to the uncoded case.

The invention claimed is:

1. WDM transmission method over optical fiber with polarization duality, intended to transmit, during one channel use, 2N symbols belonging to a modulation constellation in the complex plane, N>1 being the number of WDM channels used for transmission, wherein the WDM transmission method comprises:

said symbols undergo a separation into real part and imaginary part to provide a first vector consisting of the real parts of these symbols and a second vector consisting of the imaginary parts of these same symbols;

a first orthogonal linear transformation is applied to the first vector to provide a first transformed vector;

a second orthogonal linear transformation, distinct from the first, is applied to the second vector to provide a second transformed vector;

a complex scalar, solution of an irreducible polynome from $\mathbb{R}[X]$ in $\mathbb{R}$ is multiplied to the first or to the second transformed vector, before the two transformed vectors are summed to provide a vector consisting of 2N complex emission symbols, each complex transmission symbol modulating a first state and a second polarization state of a WDM channel.

2. WDM transmission method over optical fiber with polarization duality according to claim 1, characterized in that the first linear transformation is the composition of a first rotation with at least one transformation chosen in the group of {a first non-trivial permutation; a first non-trivial reflection} in $\mathbb{R}^{2N}$ and that the second linear transformation is the composition of a second rotation with at least one transformation choses in the group {second non-trivial permutation; a second non-trivial reflection} in $\mathbb{R}^{2N}$.

3. WDM transmission method over optical fiber with polarization duality according to claim 2, characterized in that the first permutation is composed of an even plurality of transpositions and that the second permutation is composed of an odd plurality of transpositions.

4. WDM transmission method over optical fiber with polarization duality according to claim 3, characterized in that the first rotation and the second rotation are identical.

5. WDM transmission method over optical fiber with polarization duality according to claim 2, characterized in that the first orthogonal linear transformation is identity.

6. WDM transmission method over optical fiber with polarization duality according to claim 1, characterized in that the complex scalar, $\alpha$ is chosen such that $\alpha^{2N}$ is not a positive real.

7. WDM transmission method over optical fiber with polarization duality according to claim 5, characterized in that the complex scalar is equal to j with $j^2=-1$.

8. WDM transmission method over optical fiber with polarization duality according to claim 7, characterized in that the number N is odd with N≥3.

9. WDM transmission method over optical fiber with polarization duality according to claim 2, characterized in that the first permutation is composed of an odd plurality of transpositions and that the second permutation is composed of an even plurality of transpositions.

10. WDM transmission method over optical fiber with polarization duality according to claim 9, characterized in that the first rotation and the second rotation are identical.

* * * * *